United States Patent Office 3,498,147
Patented Mar. 3, 1970

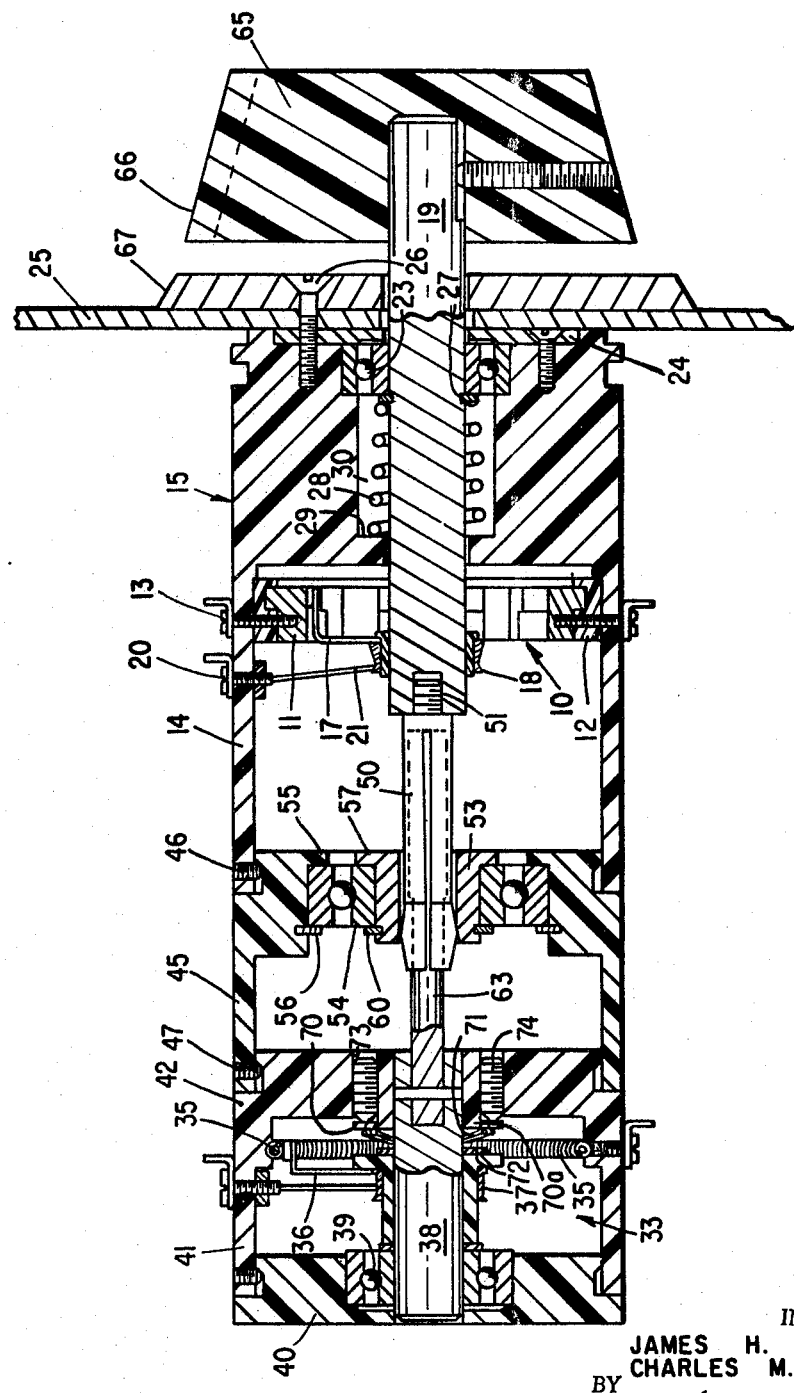
INVENTORS.
JAMES H. CAMERON.
CHARLES M. TYGARD.
BY
*Raymond Curtin*
ATTORNEY.

3,498,147
DUAL COMPONENTS ADJUSTABLE SEPARATELY, OR IN UNISON, BY A FRONT SHAFT
James H. Cameron and Charles M. Tygard, West Covina, Calif., assignors to Spectrol Electronics Corporation, City of Industry, Calif., a corporation of Delaware
Filed May 29, 1968, Ser. No. 732,911
Int. Cl. F16h *35/18;* H01h *3/00*
U.S. Cl. 74—10.45                                3 Claims

ABSTRACT OF THE DISCLOSURE

A pair of rotatably adjustable electrical components are arranged in tandem, each component having a rotatable shaft. The shafts are normally coupled for rotation in unison. Upon axial movement of one shaft, the shafts are uncoupled, whereby one component may be adjusted, or phased, without disturbing the setting of the other component. Preferably, the coupling means includes a round spring collet, whereby relative movement between the shafts during engagement and disengagement of the coupling means, is avoided.

BACKGROUND OF THE INVENTION

Heretofore arrangements have been used in which two or more electrical components are operated, or adjusted, by actuation of a single shaft. In one arrangement, the adjustable element of the components are fixed to the shaft. In another arrangement, one component is operated upon rotation of the shaft, and the other by axial movement thereof. In still another arrangement, one component is coupled to the shaft when the same is moved axially in one direction, and the other component is coupled to the shaft upon movement thereof in the opposite direction.

SUMMARY OF THE INVENTION

Our invention has to do with a dual component assembly wherein the adjustable element of each component is fixed to a shaft. The shafts are journalled in axial alignment. Normally, the shafts are coupled together whereby the components are adjusted in unison. Upon axial movement of one shaft, the shaft associated with the other component is uncoupled, whereby the component associated with the axially shifted shaft may be adjusted, or phased, without disturbing the setting of the other component. The coupling means embodies a structural arrangement whereby the second component is not moved during the coupling and uncoupling of its shaft.

BRIEF DESCRIPTION OF THE DRAWING

The drawing is a lengthwise sectional view of an assembly embodying our invention.

DESCRIPTION OF THE PREFERRED EMBODIMENT

One component is indicated generally by the reference numeral 10 and, in form shown, consists of a multi-contact switch, the fixed contacs 11 of which are mounted in an annular member 12 of insulating material. The contacts 11 are held in place by terminal screws 13 extending through the flange 14 of a cylindrical casing 15. The fixed contacts 11 are successively engaged by a rotatable contact 17 carried on a hub 18 fixed to a shaft 19. The contact 17 is connected to a terminal 20 by a conductor 21.

The shaft 19 is journalled in a bearing 23 mounted in a counterbore in the outer end of the casing 15, the outer race of the bearing being retained between the bottom of the counterbore and a circular plate 24. The casing may be attached to a panel 25, as by screws 26, extending through the panel and the disc 24, and threading into the end wall of the casing. The shaft 19 is movable axially in the bearing 23 and is provided with a snap ring 27. A helical compression spring 28 is positioned on the shaft 19 and acts against the snap ring 27 and a shoulder 29 at the inner end of a bore 30 extending inwardly from the counterbore in which the bearing is mounted.

The second component is indicated generally at 33, and is shown as a variable resistor having a circular coil 35 of resistance wire engaged by a rotatable contact 36 fixed to a hub 37 which, in turn, is fixed to a second shaft 38 journalled in a bearing 39. The bearing is positioned in a disc 40 forming a closure for the cylindrical portion 41 of a casing 42, detachably secured to one end of an intermediate cylindrical casing 45, the opposite end of which is fixed to the confronting end of the cylindrical portion 14 of casing 15, as by set screw 46. The casing 42 is secured to the portion 45 in similar manner, as by set screw 47.

The shafts 19, 38 are journalled in axial alignment. A collet chuck 50 is fixed secured to the shaft 19, as by threads 51. The tapered end portion of the collet 50 is encircled by a closing sleeve 53 mounted in a bearing 54. The bearing 54 is mounted in the intermediate casing section 45, the bearing being restrained against axial movement by the outer race of the bearing being captivated between a shoulder 55 on the casing and a snap ring 56. The closing sleeve 53 is formed at one end with a radial flange 57 engaging one end of the inner race of the bearing 54, the other end being engaged by a snap ring 60.

With this arrangement, the closing sleeve 53 is also restrained against axial movement. The location of the sleeve, relative to the closing end of the collet, is such that when the shaft 19 is biased in out position by spring 28, as shown in the drawing, the collet is closed upon an extending portion 63 of shaft 38.

An arrangement for applying troque to shaft 38 for a reason to be later explained includes disc 70 assembled about a protuberance 70a formed on a section of the casing 42, a ring 72 tightly disposed about shaft 38 and an annular spring 71 interposed between the parts 70 and 72. Threaded openings 73 accommodate set screws 74 which in turn bear against disc 70 to vary the force exerted by the spring 71 against ring 72 in engagement with hub 37.

The shaft 19 may be provided with a suitable operating knob 65 having a pointer 66 which, in conjunction with a graduated ring 67 fixed to panel 25 by the screws 26, indicates the position of the switch component 10.

With the collet closed in gripping engagement with shaft 38, it will be apparent that, upon rotation of the front shaft 19, both components 10 and 33 are adjusted in unison. Upon inward axial movement of the shaft 19 and the collet 50 carried thereby, the closing end of the collet is moved out of engagement with the closing sleeve 53, whereupon shaft 38 is uncoupled from shaft 19. With the torque applied to the shaft 38 in the manner described above, the tendency of the shaft 38 to thereafter follow the movement of the uncoupled collet 50 through frictional engagement with the relaxed jaws of the collet 50 is discouraged. Thereupon, rotation of the shaft 19 effects adjustment of the switch component 10 without disturbing the setting of the resistance component 33.

The extension 63 of shaft 38 is of circular form and the collet 50 is of the round spring type whereby, upon axial movement of the collet for disengagement with the shaft 38, no rotation is imparted to the shaft 38 and in like manner, when the collet is reclosed onto the extension 63, there is no rotation imparted to the shaft 38. This is of importance where the resistance component is in the form of a precision potentiometer, whereby a slight movement of the wiper 36 from its setting could seriously adversely affect the circuitry in which the potentiometer is connected.

While we have described a preferred embodiment of the invention, it will be understood the invention is not limited thereto since it may be otherwise embodied within the scope of the invention.

We claim:

1. An assembly of dual electric components adjustable by operation of a single shaft with means to phase one component relative to the other, said assembly comprising a casing, first and second components mounted in said casing in tandem relation, a shaft associated with each component, each component including a rotatably adjustable element fixed to said shafts respectively, said shafts being journalled in said casing in coaxial alignment, one of said shafts being restrained against axial movement, the other of said shafts being shiftable axially, releasable coupling means normally connecting said shafts for rotation in unison, said coupling means being operable upon axial movement of said shiftable shaft to release and other shaft.

2. An assembly as defined in claim 1, wherein said coupling means includes a round spring collet chuck fixed to one of said shafts, the other of said shafts having an end portion extending into said collet, a collet closing sleeve for said collet chuck, said shiftable shaft being operable upon axial movement thereof to effect relative axial movement between said collet and said sleeve, said sleeve being operable upon such relative axial movement in one direction to effect opening of said collet for release of said other shaft.

3. An assembly as defined in claim 1, wherein said coupling means includes a round spring collet fixed to said shiftable shaft, a collet closing sleeve journalled in said casing and encircling said collet, said sleeve being restrained against axial movement, said other shaft having one end portion extending into said collet, said sleeve being cooperable with said collet upon axial movement of said shiftable shaft toward said other shaft to effect release of said other shaft and, upon axial movement of said shiftable shaft in a direction from said other shaft, to close said collet in gripping engagement with said other shaft.

References Cited
UNITED STATES PATENTS 3,267,749  8/1966  Tanner et al. _____ 74—10.45

MILTON KAUFMAN, Primary Examiner

U.S. Cl. X.R.

74—10.45, 504; 192—34; 200—18; 338—200